US008404764B1

(12) United States Patent
Yu et al.

(10) Patent No.: US 8,404,764 B1
(45) Date of Patent: Mar. 26, 2013

(54) RESIN COMPOSITION AND PREPREG, LAMINATE AND CIRCUIT BOARD THEREOF

(75) Inventors: Li-Chih Yu, Tao-Yuan Hsien (TW); Tse-An Lee, Tao-Yuan Hsien (TW); Jen-Chun Wang, Tao-Yuan Hsien (TW); Yu-Te Lin, Tao-Yuan Hsien (TW); Yih-Rern Peng, Tao-Yuan Hsien (TW)

(73) Assignee: Elite Material Co., Ltd., Tao-Yuan Hsien (TW)

( * ) Notice: Subject to any disclaimer, the term of this patent is extended or adjusted under 35 U.S.C. 154(b) by 0 days.

(21) Appl. No.: 13/239,914

(22) Filed: Sep. 22, 2011

(51) Int. Cl.
*C08K 5/357* (2006.01)
(52) U.S. Cl. ............................................. 524/97
(58) Field of Classification Search .................... 524/96, 524/97
See application file for complete search history.

(56) References Cited

U.S. PATENT DOCUMENTS

| 2011/0189432 | A1* | 8/2011 | Goto et al. | 428/141 |
|---|---|---|---|---|
| 2011/0217512 | A1* | 9/2011 | Heishi et al. | 428/141 |
| 2011/0223383 | A1* | 9/2011 | Goto et al. | 428/141 |
| 2011/0244183 | A1* | 10/2011 | Goto et al. | 428/145 |

* cited by examiner

*Primary Examiner* — Peter Szekely
(74) *Attorney, Agent, or Firm* — Muncy, Geissler, Olds & Lowe, PLLC

(57) ABSTRACT

A resin composition comprises (A) 100 parts by weight of cyanate ester resin; (B) 5 to 25 parts by weight of nitrogen and oxygen containing heterocyclic compound; (C) 5 to 75 parts by weight of polyphenylene oxide resin; and (D) 5 to 100 parts by weight of oligomer of phenylmethane maleimide. By using specific components at specific proportions, the resin composition of the invention offers the features of low dielectric constant and low dissipation factor and can be made into prepreg that may be used in printed circuit board.

11 Claims, No Drawings

RESIN COMPOSITION AND PREPREG, LAMINATE AND CIRCUIT BOARD THEREOF

FIELD OF THE INVENTION

The present invention relates to a resin composition, more particularly, a thermosetting resin composition that can be used in prepreg or the insulating layer of printed circuit board.

BACKGROUND OF THE INVENTION

As the communications and bandwidth application technologies evolve rapidly, conventional materials used in the printed circuit board (PCB) industry (e.g. FR-4 laminate) can no longer meet the demands for advanced applications, particularly the demands for high frequency PCB.

To achieve high-frequency and high-speed transmission of high-frequency PCB while ensuring minimal data loss or interference in the transmission process, the materials of laminate preferably has the electrical properties, thermal resistance, hygroscopic property, mechanical properties, dimensional stability, and chemical resistance needed for the process technology and market applications.

In terms of electrical properties, major consideration should be given to the dielectric constant and dielectric loss (also called "dissipation factor") of the material. In general, signal transmission speed of the laminate is inversely proportional to the square root of its dielectric constant. That is why the smaller the dielectric constant of the laminate material is better. On the other hand, lower dissipation factor means less loss in signal transmission. Thus materials with low dissipation factor provide better transmission quality.

Therefore, how to develop materials with low dielectric constant and low dissipation factor and apply them to the manufacturing of high-frequency PCB is a pressing problem that PCB material suppliers need to address at the present time.

In light of the drawbacks of prior art, the inventor, based on his many years of experience in the industry, develops a resin composition that meet the objectives of low dielectric constant and low dissipation factor.

SUMMARY OF THE INVENTION

The primary object of the invention is to provide a resin composition, which, by using specific components at specific proportions, can offer the properties of low electric constant and low dissipation factor, and can be made into prepreg and used in PCB.

To achieve the aforesaid object, the invention provides a resin composition, comprising: (A) 100 parts by weight of cyanate ester resin; (B) 5 to 25 parts by weight of nitrogen and oxygen containing heterocyclic compound; (C) 5 to 75 parts by weight of polyphenylene oxide (PPO) resin; and (D) 5 to 100 parts by weight of oligomer of phenylmethane maleimide.

The aforesaid composition may be used in manufacturing prepreg, laminate and PCB.

By using specific components at specific proportions, the resin composition of the invention can offer the properties of low electric constant and low dissipation factor, and can be made into prepreg and used in PCB.

The component (A) cyanate ester resin in the resin composition of the invention comprises at least one selected from a group consisting of the following:

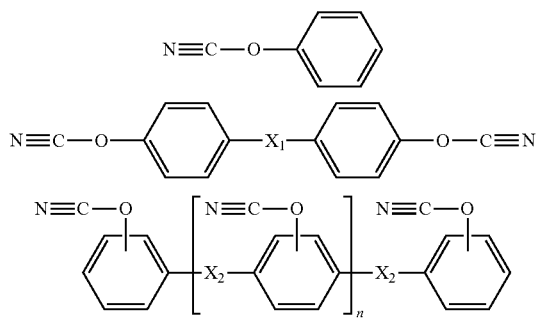

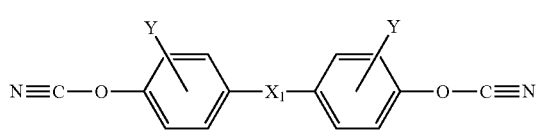

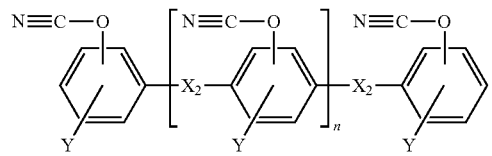

where $X_1$ and $X_2$ each independently represents at least R, Ar, $SO_2$ or O; R is selected from the group of —$C(CH_3)_2$—, —$CH(CH_3)$—, —$CH_2$—, and substituted or unsubstituted dicyclopentadienyl; Ar is selected from the group of substituted or unsubstituted benzene, biphenyl, naphthalene, phenol novolac, bisphenol A, bisphenol A novolac, bisphenol F and bisphenol F novolac function groups; n is an integer greater than or equal to 1; and Y represents hydrogen, an aliphatic functional group or an aromatic functional group.

The component (B) nitrogen and oxygen containing heterocyclic compound in the resin composition of the invention comprises a ring structure being simultaneously replaced by nitrogen and oxygen, and preferably comprises at least one selected from a group consisting of the following:

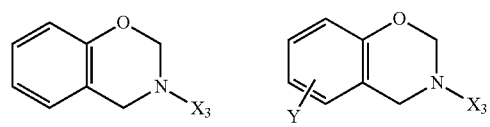

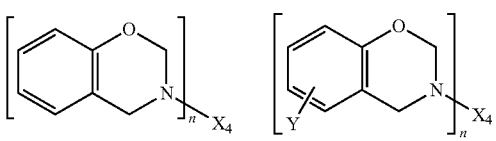

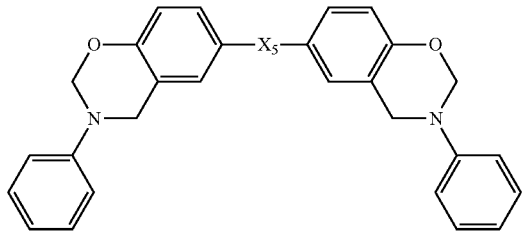

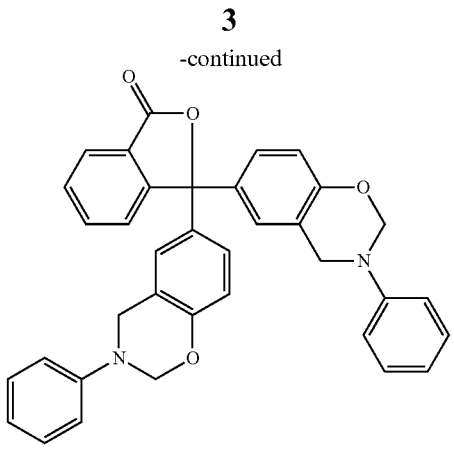

where $X_3$ represents R' or Ar; R' is selected from the group of —C(CH$_3$)$_3$, —CH$_2$(CH$_3$), —CH$_3$ and substituted or unsubstituted dicyclopentadienyl; Ar is selected from the group of substituted or unsubstituted benzene, biphenyl, naphthalene, phenol novolac, bisphenol A, bisphenol A novolac, bisphenol F and bisphenol F novolac; $X_4$ and $X_5$ each independently represents R, Ar or —SO$_2$—; R is selected from the group of —C(CH$_3$)$_2$—, —CH(CH$_3$)—, —CH$_2$— and substituted or unsubstituted dicyclopentadienyl; n is an integer greater than or equal to 1; and Y is hydrogen, an aliphatic functional group or an aromatic functional group.

Through research and experiments, the inventor finds that nitrogen and oxygen containing heterocyclic compound can bond directly with cyanate ester resin. In comparison with prior art where cyanate ester resin could effectively bond with other types of resin in the presence of a catalyst, the resin composition in this invention could engage in crosslinking in the presence or absence of a catalyst.

In the bonding reaction of nitrogen and oxygen containing heterocyclic compound with cyanate ester resin, increasing temperature could increase the rate of reaction. For example, heating nitrogen and oxygen containing heterocyclic compound and cyanate ester resin in an 150~190° C. oven for 2 to 10 minutes could accelerate the bonding and form a composition in semi-cured or fully curing state.

Given the low dielectric constant of cyanate ester resin and the low dissipation factor of nitrogen and oxygen containing heterocyclic compound, the resin composition of the invention possesses the characteristics of low dielectric constant and low dissipation factor. In addition, in the bonding process of nitrogen and oxygen containing heterocyclic compound and cyanate ester resin, the C atom and N atom in functional group —O—C≡N bond directly with respectively O atom and C atom (C atom between O atom and N atom) in the nitrogen-oxygen heterocyclic ring. Therefore, hygroscopic hydroxyl group resulting from the bonding with water molecules will not increase in this bonding process. Consequently, the resin composition of the invention has low hygroscopic property with more than 40% less moisture absorption as compared to general FR4 materials.

The component (C) polyphenylene oxide resin in the resin composition of the invention comprises at least one selected from a group consisting of the following:

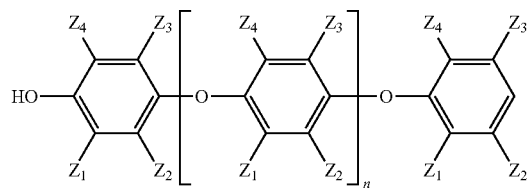

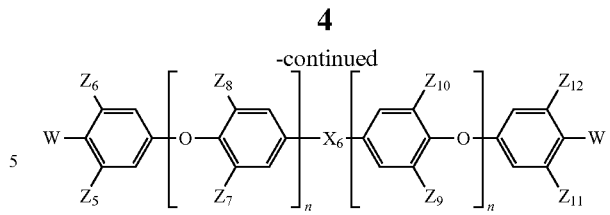

where $X_6$ is selected from the group of covalent bond, —SO$_2$—, —C(CH$_3$)$_2$—, —CH(CH$_3$)— and —CH$_2$—; $Z_1$ to $Z_{12}$ each independently represents hydrogen or a methyl group; W represents hydroxyl, ethylenyl, phenyl ethylenyl, propylenyl, butenyl, butadienyl or epoxy function group; and n is an integer greater than or equal to 1.

Because the polyphenylene oxide resin in this invention could effectively improve the dielectric properties of resin composition, the addition of polyphenylene oxide resin to nitrogen and oxygen containing heterocyclic compound and cyanate ester resin could further lower the dielectric constant and dissipation factor of the resin composition, and its effect is more pronounced at high frequency (e.g. 1 GHz to 10 GHz). In addition, because of the difficult flammability of polyphenylene oxide resin, the resin composition of the invention could also meet the UL 94 V-1 fire safety requirement.

The component (D) oligomer of phenylmethane maleimide in the resin composition of the invention has the following structural formula:

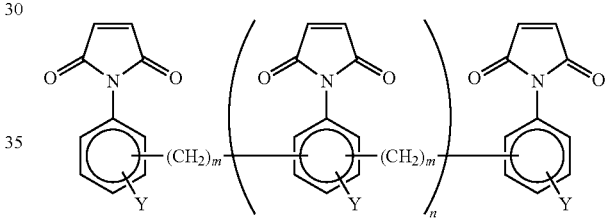

where n and m each independently represents a positive integer greater than or equal to 1, and Y is hydrogen, an aliphatic functional group or an aromatic functional group.

The content of each component in the resin composition of the invention is preferably: (A) 100 parts by weight of cyanate ester resin; (B) 5 to 25 parts by weight of nitrogen and oxygen containing heterocyclic compound; (C) 5 to 75 parts by weight of polyphenylene oxide resin; and (D) 5 to 100 parts by weight of oligomer of phenylmethane maleimide, wherein if the content of nitrogen and oxygen containing heterocyclic compound is less than 5 parts by weight, its addition will not produce the effect of lower moisture absorption; if the content of nitrogen and oxygen containing heterocyclic compound is more than 25 parts by weight, the laminate made from the resin composition will show poor thermal resistance; the addition of less than 5 parts by weight of polyphenylene oxide resin will not produce the desired effect, whereas the addition of more than 75 parts by weight of polyphenylene oxide resin will result in poor (ex. rough) appearance of prepreg made from the resin composition; the addition of less than 5 parts by weight of oligomer of phenylmethane maleimide will not produce the desired effect, whereas the addition of more than 100 parts by weight of oligomer of phenylmethane maleimide will increase the costs of the resin composition. The high costs of the resin composition, and prepreg and laminate made thereof will reduce their competitive advantage.

The invention preferably and optionally includes at least one specific flame retardant compound to further improve the flame retardancy of the resin composition. The optional flame retardant compound includes but is not limited to phosphate compound and nitrogen-containing phosphate compound. More specifically, the flame retardant compound preferably is at least one selected from a group consisting of but not limited to bisphenol diphenyl phosphate, ammonium polyphosphate, hydroquinone bis-(diphenyl phosphate), bisphenol A bis-(diphenylphosphate), tri(2-carboxyethyl)phosphine (TCEP), tri(isopropylchloro) phosphate, trimethyl phosphate (TMP), dimethyl methyl phosphonate (DMMP), resorcinol dixylenylphosphate (RDXP) (ex.: PX-200), melamine polyphosphate, phosphazene (ex.: SPB-100), phosphazo compound, 9,10-dihydro-9-oxa-10-phosphaphenanthrene-10-oxide (DOPO) and derivatives or resins thereof, melamine cyanurate, and tri-hydroxy ethyl isocyanurate.

For example, the flame retardant compound could be a DOPO compound, DOPO resin (e.g. DOPO-HQ, DOPO-PN, DOPO-BPN), or DOPO-based epoxy resin, in which DOPO-BPN could be DOPO-BPAN, DOPO-BPFN, DOPO-BPSN, or other bisphenol novolac compounds with structural formula as shown below:

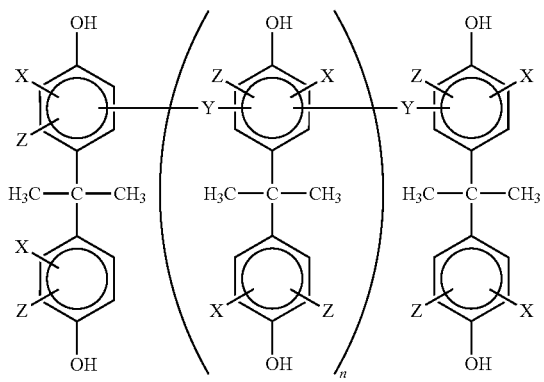

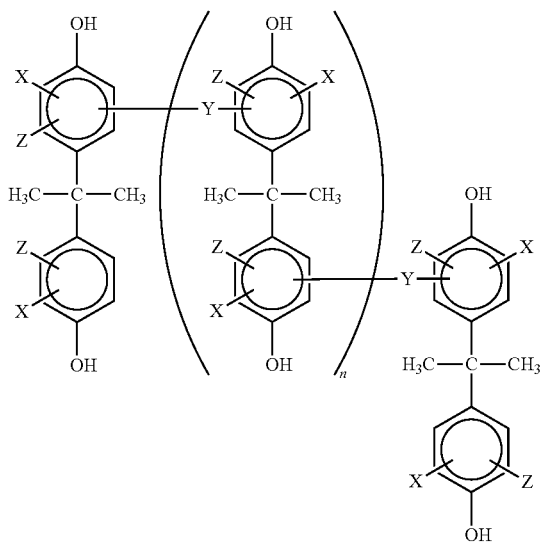

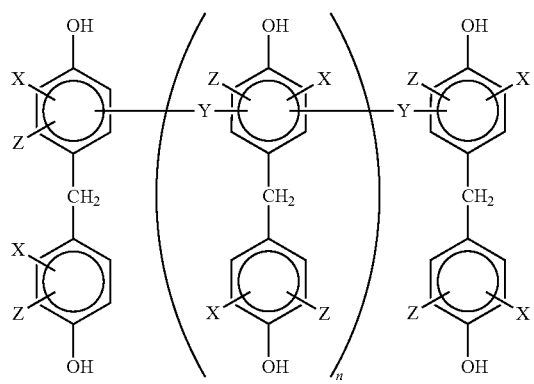

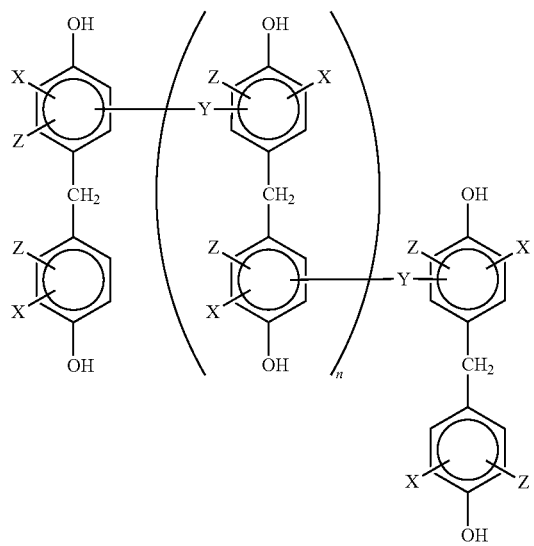

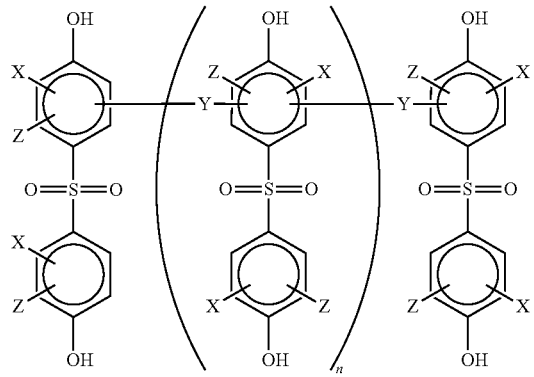

-continued

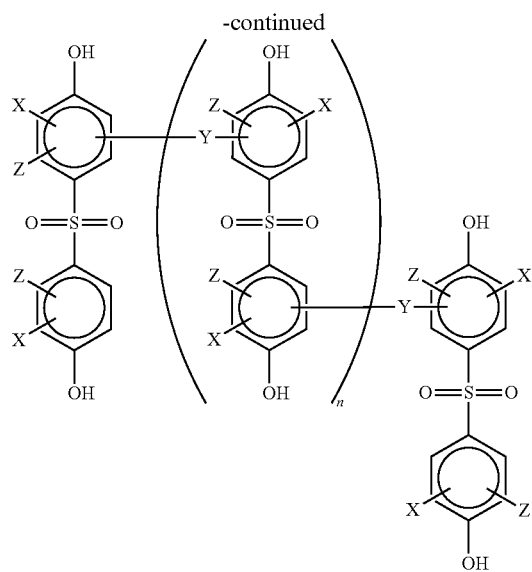

where n is an integer greater than or equal to 1; X represents DOPO functional group; Y is covalent bond, an aliphatic functional group or an aromatic functional group; and Z is hydrogen, an aliphatic functional group or an aromatic functional group. In addition, X and Z could bind to any substituting group position on the benzene ring structure and each benzene ring is not limited to having one X or Z substituting group. For example, a benzene ring can have two or more X substituting groups thereon, or two or more Z substituting groups thereon. In addition, not every benzene ring must have both X and Z substituting groups or some benzene rings have respectively X or Z substituting group or have simultaneously X and Z substituting groups, whereas some other benzene rings have neither X nor Z substituting group.

Adding a flame retardant compound to the resin composition of the invention could increase the flame retardancy of the resin composition and cured products thereof up to UL 94 V-O fire safety level. As such, laminates and PCBs that use the resin composition would possess good flame retardancy.

On the basis of 100 parts by weight of cyanate ester resin, the added flame retardant compound is preferably 10 to 200 parts by weight. This preferred content markedly improves the flame retardancy of resin composition and cured products thereof without producing any adverse effect on their physical properties.

In addition, the resin composition of the invention optionally includes at least one selected from a group consisting of epoxy resin, phenolic resin, phenol novolac resin, styrene resin, polybutadiene resin, anhydride crosslinker, and amino crosslinker, and modifications and combinations thereof.

Wherein, the epoxy resin could be bisphenol A epoxy resin, bisphenol F epoxy resin, bisphenol S epoxy resin, phenol novolac epoxy resin, bisphenol A novolac epoxy resin, o-cresol novolac epoxy resin, trifunctional epoxy resin, tetrafunctional epoxy resin, multifunctional epoxy resin, dicyclopentadiene (DCPD) epoxy resin, phosphorus-containing epoxy resin, p-xylene epoxy resin, naphthalene-based epoxy resin, benzopyran-based epoxy resin, biphenyl novolac epoxy resin, and phenol aralkyl novolac epoxy resin. With the addition of epoxy resin, the crosslinking and thermal resistance properties of the resin composition are further enhanced.

Wherein, the anhydride crosslinker could be methyl tetrahydro phthalic anhydride (MTHPA), phthalic anhydride (PA), nadic methyl anhydride (NMA), or styrene maleic anhydride (SMA); the amino crosslinker could be polyamide resin, dicyandiamide, diamino diphenylsulfone, diamino diphenyl methane and amino triazine novolac.

The resin composition of the invention optionally further comprises inorganic filler, surfactant, toughening agent, curing accelerator or solvent additive.

The main purpose of adding inorganic filler is to increase the thermal conductivity of resin composition to improve its thermal expansion and mechanical strength. The inorganic filler is preferably evenly distributed in the resin composition. The main purpose of adding surfactant is to enable even distribution of inorganic fillers in the resin composition. The main purpose of adding toughening agent is to improve the flexibility of the resin composition. The main purpose of adding curing accelerator is to increase the reaction rate of the resin composition. The main purpose of adding solvent is to change the solid content of the resin composition and modify its viscosity.

Wherein, the inorganic filler is at least one of the following: silica (fused or non-fused), aluminum oxide, magnesium oxide, magnesium hydroxide, calcium carbonate, talc, clay, aluminum nitride, boron nitride, aluminum hydroxide, aluminum silicon carbide, silicon carbide, sodium carbonate, titanium dioxide, zinc oxide, zirconium oxide, quartz, diamond powder, diamond-like powder, graphite, or calcined kaolin, and the inorganic filler is spherical or irregular in shape, and can be optionally pretreated with surfactant. The inorganic filler is granular powder under 100 μm in size, preferably 1~20 μm in size, and most preferably nanogranular powder under 1 μm in size.

The aforesaid surfactant could be silane, siloxane, amino silane or polymer thereof.

The aforesaid toughening agent could be rubber resin, polybutadiene or core-shell polymer.

The curing accelerator is a catalyst such as Lewis base or Lewis acid, wherein Lewis base includes one or the combination of imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MZ), triphenylphosphine (TPP), and 4-dimethylaminopyridine (DMAP), and Lewis acid include metal salt compound, such as the metal salt compound of manganese, iron, cobalt, nickel, copper and zinc.

The resin composition of the invention optionally further comprises other types of resin in addition to cyanate ester resin and nitrogen and oxygen containing heterocyclic compound. Under the circumstances, the resin composition could be further added with a curing accelerator to facilitate the bonding between said resin and cyanate ester resin and nitrogen and oxygen containing heterocyclic compound. For example, the resin composition further includes an epoxy resin and at least a curing accelerator. The curing accelerator could effectively promote the ring opening of epoxy resin and bonding with cyanate ester resin and nitrogen and oxygen containing heterocyclic compound.

The aforesaid solvent includes methanol, ethanol, ethylene glycol mono methylether, acetone, methyl ethyl ketone, methyl isobutyl ketone, cyclohexanone, toluene, dimethylbenzene, methoxyethyl acetate, ethoxyethyl acetate, propoxyethyl acetate, ethyl acetate, dimethyl formamide, propylene glycol methyl ether, or mixtures thereof.

Another object of the invention is to disclose a resin film having the properties of low dielectric constant, flame retardancy, low moisture absorption, and halogen-free that can be used as insulating material for laminate and PCB.

The resin film of the invention comprises the aforementioned resin composition, wherein the resin composition is heated to become semi-cured. For example, the resin composition coated on a polyethylenyl terephthalate (PET) film and heated to form resin film.

Yet another object of the invention is to disclose a laminate, comprising at least a metal foil layer and at least an insulating layer, wherein the metal foil layer is made of copper, aluminum, nickel, platinum, silver, gold or alloy thereof, and preferably copper foil. By laminating the resin film disclosed in the invention to at least one sheet of metal foil and then removing the aforesaid PET film and heat curing the resin film and the metal foil under high temperature and high pressure, an insulating layer that adheres closely to the metal foil layer is formed.

A further object of the invention is to disclose a prepreg having the properties of high mechanical strength, low dielectric constant and low dissipation factor, flame retardancy, low moisture absorption, and halogen-free. The prepreg comprises a reinforcement material and the aforementioned resin composition, wherein the reinforcement material is impregnated with the resin composition, which becomes semi-cured under high temperature heating. The reinforcement material can be fiber material, woven fabric and non-woven fabric, such as fiberglass cloth, which can increase the mechanical strength of the prepreg. In addition, the reinforcement material can be optionally pre-treated by silane coupling agent or siloxane coupling agent, such as fiberglass cloth pretreated by silane coupling agent.

The aforementioned prepreg can be cured to form a cured sheet or solid insulating layer under high temperature heating or under high temperature and high pressure condition. If the resin composition contains solvent, the solvent will evaporate in the process of high-temperature heating.

Yet another object of the invention is to disclose a laminate having the properties of low dielectric constant, flame retardancy, low moisture absorption, high mechanical strength, and halogen-free, and is particularly suitable for use in PCB capable of high-speed, high-frequency signal transmission. As such, the invention provides a laminate, comprising two or more metal foil layers and at least an insulating layer, wherein the metal foil is made of copper, aluminum, nickel, platinum, silver, gold or alloy thereof; the insulating layer is formed by curing the aforementioned prepreg under high temperature and high pressure, or by laminating the aforementioned prepreg between two metal foil and then pressing under high temperature and high pressure.

The laminate described above offers at least once of the following advantages: good flame retardancy, low moisture absorption, low dielectric constant and low dissipation factor, higher thermal conduction, lower thermal expandability, better mechanical strength, and environmentally friendly without containing halogen. The laminate may be further formed into a printed circuit board after the circuit fabrication process.

Yet another object of the invention is to disclose a printed circuit board having the properties of low dielectric constant, flame retardancy, low moisture absorption, high mechanical strength, and halogen-free and is particularly suitable for use in high-speed, high-frequency signal transmission. Wherein the printed circuit board comprises at least a laminate described above and is fabricated using standard printed circuit board fabrication process.

To further disclose the invention for implementation by people with common knowledge in the field, a few examples are cited below. However it should be noted that the examples below are meant to further explain the invention and should not be construed as a limitation on the actual applicable scope of the invention, and as such, all modifications and alterations without departing from the spirits of the invention shall remain within the protected scope and claims of the invention.

The objects, features and effects of the invention are described in detail below with embodiments in reference to the accompanying diagrams.

DETAILED DESCRIPTION OF THE PREFERRED EMBODIMENTS

The components of resin composition in Examples 2-1~2-4 are depicted in Table 1, while those of Comparative Examples 1~6 are depicted in Table 3.

Example 1 (E1)

A resin composition comprising:
(A) 100 parts by weight of cyanate ester resin as shown below;

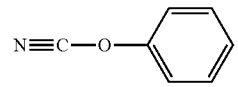

(B) 20 parts by weight of nitrogen and oxygen containing heterocyclic compound as shown below, where $X_5$ is defined the same as above;

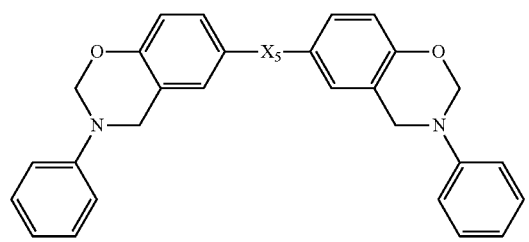

(C) 50 parts by weight of polyphenylene oxide resin, where n is an integer greater than or equal to 1; and

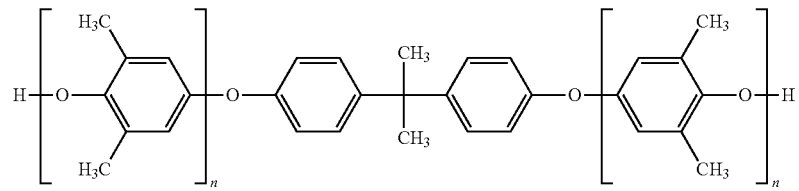

(D) 50 parts by weight of oligomer of phenylmethane maleimide, where n and m each independently represents an integer greater than or equal to 1 as shown below (product name: BMI-2300).

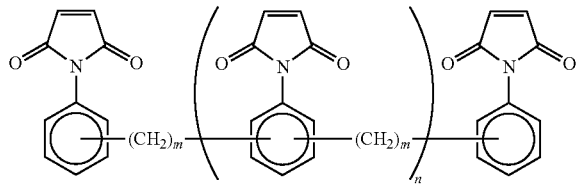

Example 2-1 (E2-1)

A resin composition comprising:
(A) 100 parts by weight of cyanate ester resin (product name: BA-230S) as shown below;

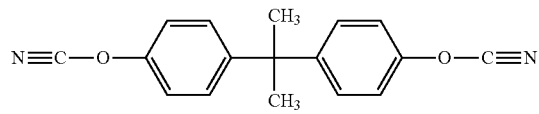

(B) 25 parts by weight of nitrogen and oxygen containing heterocyclic compound (Benzoxazine) as shown below;

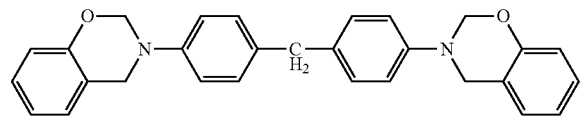

(C) 75 parts by weight of polyphenylene oxide resin (PPO) as shown below, where n is an integer greater than or equal to 1;

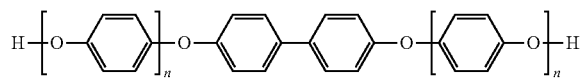

(D) 50 parts by weight of oligomer of phenylmethane maleimide as shown below, where n and m each independently represents an integer greater than or equal to 1 (product name: BMI-2300).

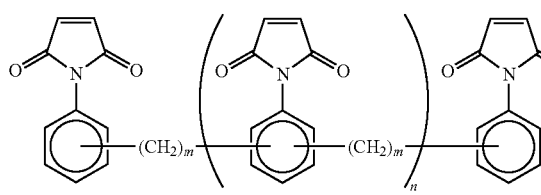

(E) 100 parts by weight of dicyclopentadiene (DCPD) epoxy resin;
(F) 50 parts by weight of flame retardant (RDXP);
(G) 0.1 parts by weight of cobalt salt compound (cobalt octanoate);
(H) 0.2 parts by weight of 2-phenylimidazole (2PZ);
(I) 50 parts by weight of fused silica;
(J) 0.4 parts by weight of siloxane; and
(K) 50 parts by weight of methyl ethyl ketone (MEK).

Example 2-2~2-4 (E2-2~E2-4)

Examples 2-2~2-4 (E2-2~E2-4) are basically the same as E2-1. The difference is E2-2 used 5 parts by weight of nitrogen and oxygen containing heterocyclic compound; E2-3 used 5 parts by weight of polyphenylene oxide resin; and E2-4 used 5 parts by weight of oligomer of phenylmethane maleimide.

Example 3 (E3)

A resin composition comprising:
(A) 100 parts by weight of cyanate ester resin as shown below;

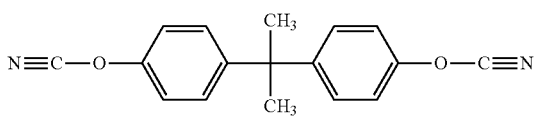

(B) 25 parts by weight of nitrogen and oxygen containing heterocyclic compound as shown below;

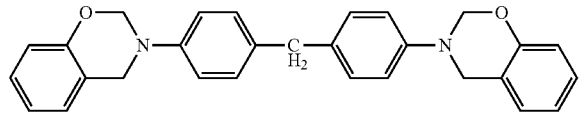

(C) 75 parts by weight of polyphenylene oxide resin as shown below, where n is an integer greater than or equal to 1;

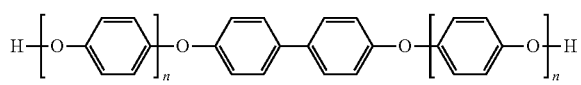

(D) 50 parts by weight of oligomer of phenylmethane maleimide as shown below, where n and m each independently represents an integer greater than or equal to 1;

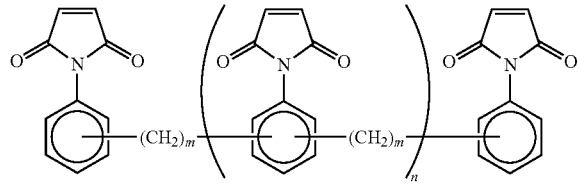

(E) 100 parts by weight of DOPO-BPAN resin;
(F) 50 parts by weight of phosphazene;
(G) 50 parts by weight of spherical silica;
(H) 1 parts by weight of siloxane; and
(I) 50 parts by weight of MEK.

Example 4 (E4)

A resin composition comprising:
(A) 100 parts by weight of PPO-modified cyanate ester resin as shown below:

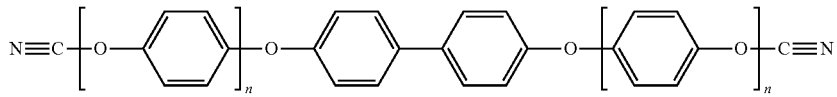

(B) 25 parts by weight of nitrogen and oxygen containing heterocyclic compound as shown below;

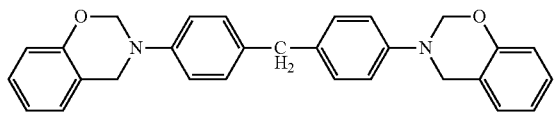 [SMILES: c1ccc2c(c1)CN(c1ccc(Cc3ccc(N4COc5ccccc5C4)cc3)cc1)CO2]

(C) 50 parts by weight of oligomer of phenylmethane maleimide as shown below, where n and m each independently represents an integer greater than or equal to 1; and

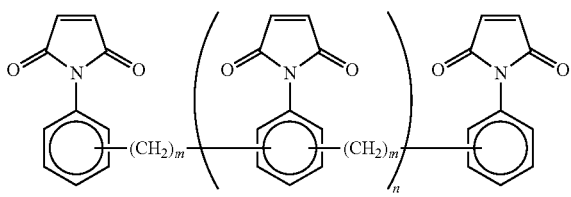

(D) 50 parts by weight of flame retardant (RDXP).

Example 5 (E5)

A resin film was prepared by mixing uniformly the resin composition disclosed in E2 in a blender and then coating it on a PET sheet, and heating the resin composition into semi-cured state.

Example 6 (E6)

A prepreg (PP) was prepared in the following manner: Mix respectively the resin composition disclosed in E2-1~2-4 uniformly and then place it in an impregnator. Pass a fiberglass cloth through the aforesaid impregnator to impregnate the resin composition thereon, and then heat the resin composition into semi-cured state.

Example 7 (E7)

A laminate comprising a resin film, a copper foil sheet and a circuit board was prepared in the following manner: Superimpose the PET-free surface of resin film as described in E5 on the circuit board; remove the PET sheet, and then superimpose the surface of resin film with PET sheet removed on the copper foil; cure the resin composition under high temperature and high pressure into an insulating layer between the copper foil and the circuit board.

Example 8 (E8)

A laminate comprising four sheets of prepreg as described in E6 and two sheets of copper foil was prepared in the following manner: Laminate in sequence copper foil, four sheets of prepreg and copper foil; cure the four prepreg sheets under high temperature and high pressure into an insulating layer between the two copper foil sheets.

Use respectively resin compositions in E2-1~E2-4 to fabricate laminates according to the process described in E6 and E8. The physical property testing results of the laminates are shown in Table 2 below.

Example 9 (E9)

A printed circuit board comprising a multilayer laminates and a plurality of prepregs was prepared, wherein the laminates are those as described in E8 which form surface circuit through lithography and etching process, and the prepregs are those as described in E6. The plurality of laminates and plurality of prepregs were alternately superimposed onto each other between two sheets of copper foil. The laminated structure was then pressed under high temperature and high pressure to form a circuit board, which is then made into a printed circuit board using standard printed circuit board process.

Example 10 (E10)

A printed circuit board with main structure as described in Example 9 was prepared, where the difference is that the laminates are bored to form blind holes.

Comparative Example 1 (C1)

A resin composition comprising:
(A) 100 parts by weight of cyanate ester resin as shown below (product name: BA-230S);

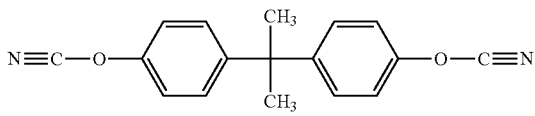

(B) 2 parts by weight of nitrogen and oxygen containing heterocyclic compound as shown below;

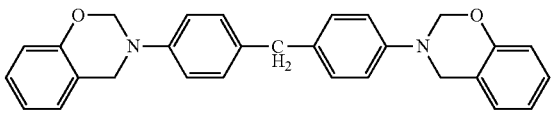

(C) 75 parts by weight of polyphenylene oxide resin as shown below, where n is an integer greater than or equal to 1;

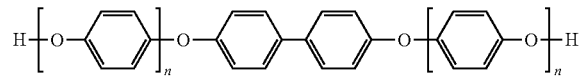

(D) 50 parts by weight of oligomer of phenylmethane maleimide as shown below, where n and m each independently represents an integer greater than or equal to 1 (product name: BMI-2300);

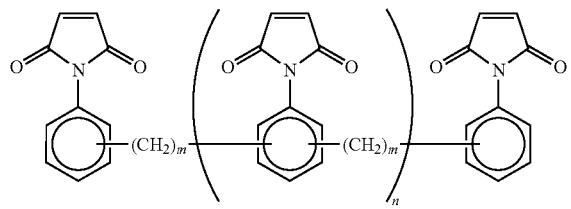

(E) 100 parts by weight of dicyclopentadiene epoxy resin;
(F) 50 parts by weight of flame retardant (RDXP);
(G) 0.1 parts by weight of cobalt salt compound;
(H) 0.2 parts by weight of 2-phenylimidazole;
(I) 50 parts by weight of fused silica;
(J) 0.4 parts by weight of siloxane; and
(K) 50 parts by weight of MEK.

Comparative Examples 2~6 (C2~C6)

Comparative Examples 2~6 (C2~C6) are basically the same as C1. The difference is C2 used 30 parts by weight of nitrogen and oxygen containing heterocyclic compound; C3 used 2 parts by weight of polyphenylene oxide resin; C4 used 80 parts by weight of polyphenylene oxide resin; C5 used 2 parts by weight of oligomer of phenylmethane maleimide; and C6 used 105 parts by weight of oligomer of phenylmethane maleimide Use respectively the resin compositions in C1~C6 to prepare copper clad laminates with the methods described in E6 and E8. Subject the aforesaid copper clad laminates and copper-free laminates after copper foil etching to physical property testing. The tested items included glass transition temperature (Tg), heat resistance (T288), decomposition temperature of laminate (Td), solder dip test of copper-containing laminate (S/D, solder dip 288° C., 10 seconds, test the number of dip cycles to thermal delamination), solder dip test of copper-free laminate after pressure cooking test (PCT) (pressure cooking at 121° C., 1 hr, then solder dip 288° C., 20 seconds to observe the presence of delamination), moisture absorption (measure the difference between the weights of copper-free laminate before and after PCT (1 hr) to obtain moisture absorption), peeling strength between copper foil and laminate (P/S, half ounce copper foil), dielectric constant (Dk), dissipation factor (Df), flaming test (UL94). The test results are shown in Table 4.

The test results of E2-1 and E2-2 show that increasing the amount of nitrogen and oxygen containing heterocyclic compound could effectively reduce the moisture absorption of the laminate. The test results of C1 show that when the content of nitrogen and oxygen containing heterocyclic compound is below 5 parts by weight, the moisture absorption of the laminate is increased to 0.4%. The test results of C2 show that when the content of nitrogen and oxygen containing heterocyclic compound is more than 25 parts by weight, the laminate displays poorer heat resistance (as indicated by poorer T288, Td and S/D, and delamination occurs in PCT test).

Based on the test results of E2-1 and E2-3, increasing the amount of polyphenylene oxide resin could lower the Df value. The test results of C3 show that when the content of PPO is below 5 parts by weight, the Df of laminate would increase to an unexpected level. The test results of C4 show that when the content of PPO is more than 75 parts by weight, the prepreg displays poor (ex. rough) external appearance, thereby resulting in lower process yield, and the S/D testing is also failed.

Based on the test results of E2-1 and E2-4, increasing the amount of oligomer of phenylmethane maleimide could increase the Tg value of the laminate. According to the test results of C5, when the content of oligomer of phenylmethane maleimide is below 5 parts by weight, the Tg value of the laminate will drop below the expected value. According to the test results of C6, the Tg value of the laminate will increase significantly when the content of oligomer of phenylmethane maleimide exceeds 100 parts by weight. But it will also jack up the costs of the resin composition and the laminate that the products will not be cost competitive.

TABLE 1

| Components | | E2-1 | E2-2 | E2-3 | E2-4 |
|---|---|---|---|---|---|
| Cyanate ester resin | BA-230S | 100 | 100 | 100 | 100 |
| Nitrogen and oxygen containing heterocyclic compound | Benzoxazine | 25 | 5 | 25 | 25 |
| Polyphenylene oxide resin | PPO | 75 | 75 | 5 | 75 |
| Maleimide | BMI-2300 | 50 | 50 | 50 | 5 |
| Flame retardant | RDXP | 50 | 50 | 50 | 50 |
| Epoxy resin | DCPD-epoxy | 100 | 100 | 100 | 100 |
| Inorganic filler | fused silica | 50 | 50 | 50 | 50 |
| Siloxane compound | Siloxane | 0.4 | 0.4 | 0.4 | 0.4 |
| Catalyst | Cobalt octanoate | 0.1 | 0.1 | 0.1 | 0.1 |
|  | 2PZ | 0.2 | 0.2 | 0.2 | 0.2 |
| Solvent | MEK | 50 | 50 | 50 | 50 |

TABLE 2

| Property test | Test method | E2-1 | E2-2 | E2-3 | E2-4 |
|---|---|---|---|---|---|
| Tg | DSC (° C.) | 181 | 178 | 184 | 173 |
| T288 | TMA (min) | >70 | >70 | >70 | >70 |
| Td | TGA (° C.) | 391 | 394 | 396 | 392 |
| S/D | dip cycles (288° C.) | >40 | >40 | >40 | >40 |
| PCT (1 hr) | dip 288° C., 20 s | Pass | pass | pass | pass |
| Moisture absorption (%) | after PCT (1 hr) | 0.25 | 0.38 | 0.25 | 0.25 |
| P/S | Hoz Cu foil | 6.5 | 6.6 | 6.9 | 6.5 |
| Dk | 1 GHz | 3.75 | 3.73 | 3.75 | 3.75 |
| Df | 1 GHz | 0.0055 | 0.0055 | 0.0063 | 0.0055 |
| Flaming test | UL94 | V-0 | V-0 | V-0 | V-0 |
| Cost |  | normal | normal | normal | low |
| Others | PP appearance | smooth | smooth | smooth | smooth |

TABLE 3

| Component | | C1 | C2 | C3 | C4 | C5 | C6 |
|---|---|---|---|---|---|---|---|
| Cyanate ester resin | BA-230S | 100 | 100 | 100 | 100 | 100 | 100 |
| Nitrogen and Oxygen containing heterocyclic compound | Benzoxazine | 2 | 30 | 25 | 25 | 25 | 25 |
| Polyphenylene oxide resin | PPO | 75 | 75 | 2 | 80 | 75 | 75 |
| Maleimide | BMI-2300 | 50 | 50 | 50 | 50 | 2 | 105 |
| Flame retardant | RDXP | 50 | 50 | 50 | 50 | 50 | 50 |
| Epoxy resin | DCPD-epoxy | 100 | 100 | 100 | 100 | 100 | 100 |
| Inorganic filler | Fused silica | 50 | 50 | 50 | 50 | 50 | 50 |
| Siloxane compound | Siloxane | 0.4 | 0.4 | 0.4 | 0.4 | 0.4 | 0.4 |
| Catalyst | Cobalt octanoate | 0.1 | 0.1 | 0.1 | 0.1 | 0.1 | 0.1 |
| | 2PZ | 0.2 | 0.2 | 0.2 | 0.2 | 0.2 | 0.2 |
| Solvent | MEK | 50 | 50 | 50 | 50 | 50 | 50 |

TABLE 4

| Property test | Test method | C1 | C2 | C3 | C4 | C5 | C6 |
|---|---|---|---|---|---|---|---|
| Tg | DSC(° C.) | 178 | 183 | 186 | 175 | 171 | 191 |
| T288 | TMA (min) | >70 | 24 | >70 | >70 | >70 | >70 |
| Td | TGA(° C.) | 390 | 381 | 396 | 383 | 390 | 390 |
| S/D | dip cycles(288° C.) | >40 | 13 | >40 | 23 | >40 | >40 |
| PCT (1 hr) | dip 288° C., 20 s | pass | fail | pass | pass | pass | pass |
| Moisture absorption (%) | after PCT (1 hr) | 0.40 | 0.25 | 0.25 | 0.26 | 0.25 | 0.25 |
| P/S | Hoz Cu foil | 6.6 | 6.4 | 6.9 | 6.2 | 6.5 | 6.5 |
| Dk | 1 GHz | 3.73 | 3.81 | 3.86 | 3.76 | 3.75 | 3.75 |
| Df | 1 GHz | 0.0055 | 0.0055 | 0.0064 | 0.0053 | 0.0055 | 0.0055 |
| Flaming test | UL94 | V-0 | V-0 | V-0 | V-0 | V-0 | V-0 |
| Cost | | normal | normal | normal | normal | Low | High |
| Others | PP appearance | smooth | smooth | smooth | rough | smooth | smooth |

As described above, the invention meets the three criteria of patentability, i.e. novelty, inventive step and usefulness. In terms of novelty and inventive step, the resin composition of the invention offers the features of low dielectric constant and low dissipation factor by using specific components at specific proportions, and can be made into prepreg or resin film for application in the printed circuit board. In terms of usefulness, using the products derived from the invention could fully meet the current market demands.

The preferred embodiments of the present invention have been disclosed in the examples. However the examples should not be construed as a limitation on the actual applicable scope of the invention, and as such, all modifications and alterations without departing from the spirits of the invention shall remain within the protected scope and claims of the invention.

What is claimed is:

1. A resin composition, comprising:
(A) 100 parts by weight of cyanate ester resin;
(B) 5 to 25 parts by weight of nitrogen and oxygen containing heterocyclic compound;
(C) 5 to 75 parts by weight of polyphenylene oxide (PPO) resin; and
(D) 5 to 100 parts by weight of oligomer of phenylmethane maleimide.

2. The composition according to claim 1, wherein the cyanate ester resin comprises at least one selected from a group consisting of the following:

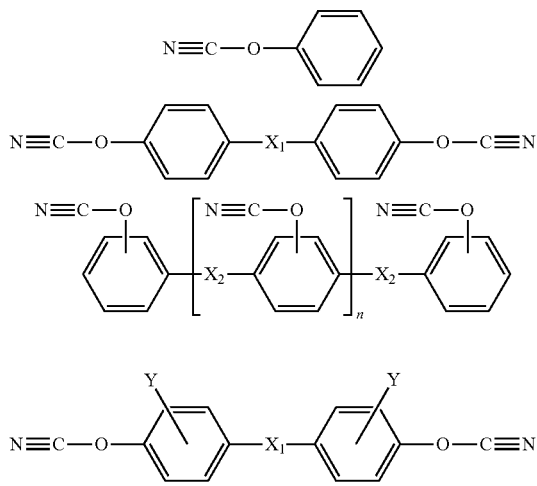

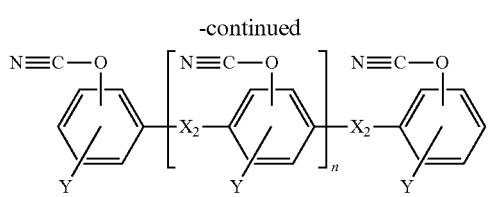

-continued where $X_1$ and $X_2$ each independently represents at least R, Ar, $SO_2$ or O; R is selected from the group consisting of —C(CH$_3$)$_2$, —CH(CH$_3$)—, —CH$_2$—, substituted dicyclopentadienyl and unsubstituted dicyclopentadienyl; Ar is selected from the group consisting of substituted benzene and unsubstituted benzene, biphenyl, naphthalene, phenol novolac, bisphenol A, bisphenol A novolac, bisphenol F and bisphenol F novolac functional group; n is an integer greater than or equal to 1; and Y is hydrogen, an aliphatic functional group or an aromatic functional group.

3. The composition according to claim 1, wherein the nitrogen and oxygen containing heterocyclic compound comprises at least one selected from a group consisting of the following:

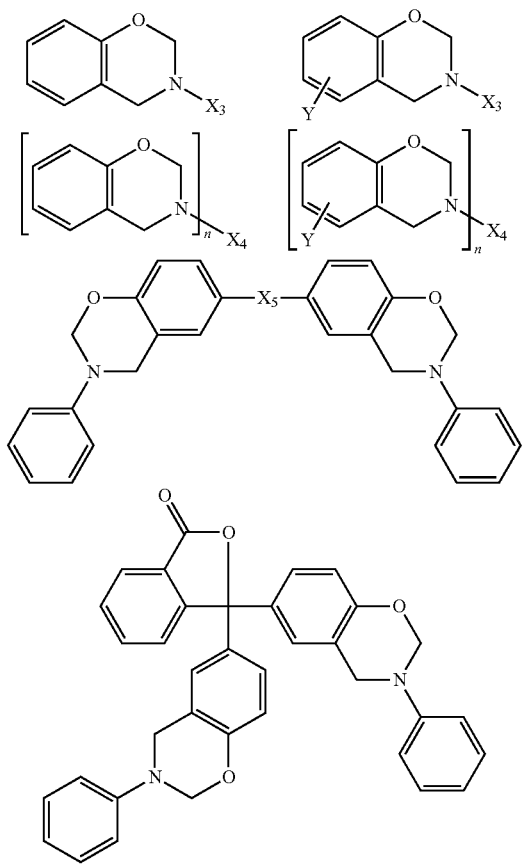

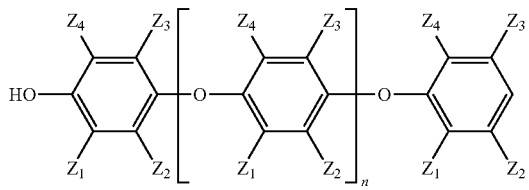

where $X_3$ is R' or Ar; R' is selected from the group consisting of —C(CH$_3$)$_3$, —CH$_2$(CH$_3$), —CH$_3$, substituted dicyclopentadienyl and unsubstituted dicyclopentadienyl; Ar is selected from the group consisting of substituted benzene and unsubstituted benzene, biphenyl, naphthalene, phenol novolac, bisphenol A, bisphenol A novolac, bisphenol F and bisphenol F novolac; $X_4$ and $X_s$ each independently represents R, Ar or —SO$_2$—; R is selected from the group of —C(CH$_3$)$_2$—, —CH(CH$_3$)—, —CH$_2$— and substituted or unsubstituted dicyclopentadienyl; n is an integer greater than or equal to 1; and Y is hydrogen, an aliphatic functional group or an aromatic functional group.

4. The composition according to claim 1, wherein the polyphenylene oxide resin comprises at least one selected from a group consisting of:

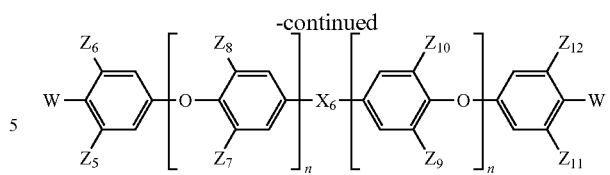

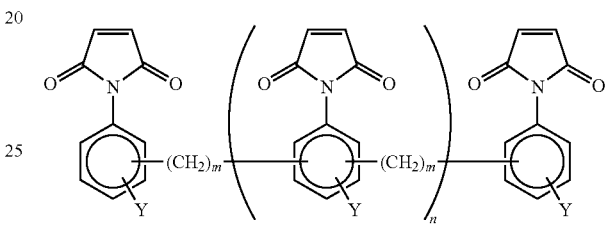

where $X_6$ is selected from the group of covalent bond, —SO$_2$—, —C(CH$_3$)$_2$—, —CH(CH$_3$)—, —CH$_2$—; $Z_1$ to $Z_{12}$ each independently represents hydrogen or a methyl group; W represents hydroxyl, ethylenyl, phenyl ethylenyl, propylenyl, butenyl, butadienyl or epoxy function group; and n is an integer greater than or equal to 1.

5. The composition according to claim 1, wherein the oligomer of phenylmethane maleimide has the following structural formula:

where n and m each independently represents a positive integer greater than or equal to 1;
and Y is hydrogen, an aliphatic functional group or an aromatic functional group.

6. The composition according to claim 1, further comprising at least one compound or modification thereof selected from a group consisting of bisphenol diphenyl phosphate, ammonium polyphosphate, hydroquinone bis-(diphenyl phosphate), bisphenol A bis-(diphenylphosphate), tri(2-carboxyethyl)phosphine (TCEP), tri(isopropylchloro) phosphate, trimethyl phosphate (TMP), dimethyl methyl phosphonate (DMMP), resorcinol dixylenylphosphate (RDXP) (ex.: PX-200), melamine polyphosphate, phosphazene (ex.: SPB-100), phosphazo compound, 9,10-dihydro-9-oxa-10-phosphaphenanthrene-10-oxide (DOPO), melamine cyanurate, and tri-hydroxy ethyl isocyanurate.

7. The composition according to claim 1, further comprising at least one compound or modifications thereof selected from a group consisting of epoxy resin, phenolic resin, phenol novolac resin, styrene resin, polybutadiene resin, anhydride crosslinker, and amino crosslinker.

8. The composition according to claim 1, further comprising at least one selected from a group consisting of inorganic filler, surfactant, toughening agent, curing accelerator and solvent.

9. A prepreg comprising the resin composition according to claim 1.

10. A metal clad laminate comprising the prepreg according to claim 9.

11. A printed circuit board comprising the metal clad laminate according to claim 10.

* * * * *